252-95 AU 157 EX
3/31/87 XR 4,654,395

United States Patent [19]

Schulz et al.

[11] Patent Number: 4,654,395

[45] Date of Patent: Mar. 31, 1987

[54] WATER-SOLUBLE POLYMER SHEET FOR DELIVERING LAUNDRY CARE ADDITIVE AND LAUNDRY CARE PRODUCT FORMED FROM SAME

[75] Inventors: Gerald O. Schulz; Thomas D. Gueldenzopf, both of Racine County, Wis.

[73] Assignee: S. C. Johnson & Son, Inc., Racine, Wis.

[21] Appl. No.: 754,808

[22] Filed: Jul. 12, 1985

Related U.S. Application Data

[62] Division of Ser. No. 598,103, Apr. 9, 1984, Pat. No. 4,557,852.

[51] Int. Cl.[4] .......................... C08F 20/06; C08F 20/10; C11D 17/00

[52] U.S. Cl. .................................. 526/318.42; 252/90; 252/91; 252/174.24; 252/DIG. 2; 252/DIG. 3; 252/95; 524/560; 525/330.2; 526/240; 526/271

[58] Field of Search .............. 252/91, 174.24, DIG. 3; 524/560; 526/16, 240, 318.42, 271; 525/330.2

[56] References Cited

U.S. PATENT DOCUMENTS

| | | | |
|---|---|---|---|
| 3,070,583 | 12/1962 | Uraneck et al. | 526/240 X |
| 3,723,323 | 3/1973 | Morgan et al. | 524/560 |
| 3,959,237 | 5/1976 | Blank | 524/560 X |
| 4,115,331 | 9/1978 | Tominaga et al. | 524/560 |
| 4,241,141 | 12/1980 | Dill | 428/500 |
| 4,532,063 | 7/1985 | Gueldenzopf | 252/90 |

FOREIGN PATENT DOCUMENTS

| | | |
|---|---|---|
| 249759 | 2/1964 | Australia . |
| 856322 | 11/1970 | Canada . |
| 1103099 | 6/1981 | Canada . |
| 124131 | 11/1974 | Japan . |
| 1023281 | 3/1966 | United Kingdom . |
| 1505555 | 3/1978 | United Kingdom . |

*Primary Examiner*—Prince E. Willis

[57] ABSTRACT

An addition polymer of a water insoluble soft monomer, a water soluble anionic monomer and, optionally, a water soluble nonionic monomer and water insoluble hard monomer is neutralized to at least about 75%, and formed into a sheet. A laundry care additive, as a bleach, may be stored between a pair of opposed heat sealed sheets to provide a laundry care product adapted to be introduced into a laundry wash.

6 Claims, No Drawings

WATER-SOLUBLE POLYMER SHEET FOR DELIVERING LAUNDRY CARE ADDITIVE AND LAUNDRY CARE PRODUCT FORMED FROM SAME

This is a divisional of co-pending application Ser. No. 06/598,103, filed on 4/9/84, now U.S. Pat. No. 4,557,852.

BACKGROUND OF THE INVENTION

This invention relates to a polymeric sheet or carrier capable of storing and delivering to a wash, corrosive laundry care additives. In particular, it relates to a storage-stable sheet for packaging laundry care additives which is soluble in aqueous and detergent solutions.

It has long been desired to provide a single vehicle adapted to permit prepackaging of desired amounts of laundry care additives and for delivering such additives to a washing machine or other laundry water by simply adding a package formed from that vehicle to the wash. Typical washing machine additives include corrosive bleaches, enzymes, fabric softeners, fabric conditioners, wrinkle-release additives, additives for imparting a specific feel or "hand" to fabrics and detergents. Since many of such additives are not compatible with the skin and become degraded during storage without suitable protection, there has been a continuing problem for storing such additives and for delivering them to a washing machine or the like.

It has been proposed to employ packages comprising water soluble bags containing detergents for laundry use. Such bags are particularly appealing for home use where a measured amount of laundry care additive, such as a bleach or detergent, may be added directly into a laundering machine without waste or mess. Such packages are intended to provide the required amount of laundry care additive for a single filling of that machine.

Until now, however, such packages or other delivery systems have not proved entirely satisfactory. The difficulties in fabricating satisfactory packages have frustrated the art for many years. Sheet material for carrying a laundry care additive must simultaneously satisfy many conflicting requirements. The material must form a self-supporting film which rapidly dissolves or disperses in wash water at temperatures typically from about 60° F. to 140° F.

It has been proposed, for example, in U.S. Pat. No. 3,322,674 to employ polymeric materials having water solubilizing groups or hydrophilic groups for that purpose. Such dissolvable film forming materials, as poly(-vinyl alcohol) or cellulosic derivatives, however, where found to be oxidized by and rendered insoluble by strong laundry care additives, such as chlorine bleaches. Accordingly, it has been proposed to employ a barrier coating on the inside surface of the laundry package to shield the packaging material from the chlorine bleach. However, such packets have not been satisfactory, since upon prolonged storage, the barrier coatings tend to crack or tear and permit the bleach to contact the packaging material. After prolonged contact, the packaging material is oxidized and becomes water insoluble and the chlorine bleach loses its activity.

Conventional solution polymers providing high water solubility and containing from 25-50% of alkali-soluble monomers have been found to be unsuitable as laundry care packaging material. Films formed from such polymers are hygroscopic and, during storage at high relative humidity, tend to lose dimensional stability and become unduly tacky. In addition, at high temperatures and low relative humidity often encountered during storage, such films tend to become unduly brittle. Accordingly, rolls of tear off packages formed from such sheet material may not readily separate by tearing. Further, conventional water-soluble polymers often lose their flexibility, during storage at low temperatures of 0° F. or lower.

Other water soluble, film forming material, such as cellulosic materials, are not easily cast into sheets and are not readily heat sealable. Accordingly, it can be difficult and time consuming to economically utilize such materials.

It is, therefore, a primary object of this invention to provide a polymeric carrier in sheet form capable of retaining a pre-selected amount of a reactive laundry care additive, which carrier is inert and stable to said additive during storage.

It is another object of this invention to provide a water-soluble carrier for delivering laundry additive which will dissolve readily in aqueous or detergent solutions at temperatures from about 60° F. to about 140° F.

It is a further object of this invention to provide a polymeric film which possesses sufficient strength to resist the rigors of mechanical packaging processes, but which retains sufficient flexibility to permit handling without premature rupture or disintegration.

It is a still further object of the present invention to provide a water-soluble polymeric film which resists the destabilizing effects of high humidity.

It is yet another object of the invention to provide a polymeric film which resists enbrittlement at low relative humidity or at low temperatures.

It is an additional object of the invention to provide a laundry care sheet for retaining and delivering particulate bleaches to a laundry wash.

SUMMARY OF THE INVENTION

The above and other objects are met in a water soluble sheet for delivering laundry additive which comprises a self-supporting film of an addition polymer formed from:

(a) from about 40 to 95% by weight of a water-insoluble soft monomer;
(b) from about 3 to 15% by weight of a water-soluble anionic monomer;
(c) from about 0 to 25% by weight of a water-soluble nonionic monomer; and
(d) from about 0 to 40% by weight of a water-insoluble hard monomer, wherein the addition polymer is neutralized to at least about 75% of theoretical employing a Group IA metal base or a Group IA metal basic salt.

The film of the invention may be relatively low molecular weight acrylic copolymer. It has been found that such acrylic polymers possess unusual stability towards reactive laundry care additives, including particulate chlorine bleaches. Such polymers also possess sufficient mechanical strength to be formulated into sheets for laundry care products and can be formulated to maintain their integrity over a broad range of temperature and humidity.

The polymers of the invention are readily prepared by conventional free-radical polymerization. Sheets formed from acrylic polymers are readily heat sealed to provide storage stable products. In addition, the polymer sheet is not substantive to conventional fibers and is inert to conventional laundry additives.

A laundry care product is provided having a particulate laundry care additive carried by the sheet of the invention. In one aspect of the product is a uniformly dispersed particulate layer of laundry care additive contained within a unit formed by the sheet of the invention. The product is produced, for example, by forming a unit including a dispersed layer of laundry care additive and at least one sheet of the invention and then sealing the unit.

Since the sheet form of the laundry care product contains the bleach as physically separated particles, this invention offers the following advantages over water soluble bags:

(1) Clumping of the active ingredient is not possible;
(2) There can be more controlled metering of the dissolving bleach;
(3) Spot damage to the fabrics is minimized.

DETAILED DESCRIPTION OF THE INVENTION

The addition polymers of the invention utilize a soft, water-insoluble monomer. Suitable polymerizable monomers which form soft, water-insoluble polymers in the presence of free-radical catalysts include primary and secondary alkyl acrylates, having alkyl substituents with up to 18 or more carbon atoms; primary or secondary alkyl methacrylates having alkyl substituents of 5 to 18 or more carbon atoms or other ethylenically-unsaturated compounds which are polymerizable with free-radical catalysts to from soft, solid polymers. Other typical soft monomers of the invention include: vinyl esters of saturated monocarboxylic acids, olefin monomers, such as ethylene and propylene, and conjugated dienes forming rubbery latices such as butadiene, chloroprene, isobutene and isoprene.

The preferred soft monomers include alkyl acrylates in which the alkyl group has from 1 to 8 carbon atoms and alkyl methacrylates wherein the alkyl group has from 5 to 18 carbon atoms. Examples of such compounds include: amyl acrylate; 2-ethylhexyl acrylate; octyl acrylate; n-amyl methacrylate; hexyl methacrylate; octyl methacrylate; dodecyl methacrylate and those acrylates or methacrylates with substituted alkyl groups, such as butoxyethyl acrylate or methacrylate.

Best results are obtained, and accordingly, it is especially preferred to employ alkyl acrylates in which the alkyl group has from 1 to 4 carbon atoms. Typical compounds include; methyl acrylate, ethyl acrylate, propyl acrylate and butyl acrylate.

The water-soluble anionic monomer which is combined with the water-insoluble soft monomer to form an addition polymer of the invention includes monomers having water or alkali-solubilizing anionic functionalities including carboxyl groups, sulfonic acid groups, sulfate groups, phosphate groups and the like. If desired, monomeric precursors such as acrylamides, maleic anhydride, acrylic esters, acrylonitrile and the like can be employed in the addition reaction under conditions where they form inonizable groups, such as carboxyl groups, in the copolymer.

Monomers containing carboxylic acid are preferred including: maleic acid; fumaric acid; itaconic acid and the like. Best results are obtained and, accordingly, it is preferred to employ as the anionic monomer, methacrylic acid or acrylic acid.

A preferred addition polymer includes a low molecular weight acrylic copolymer formed from a water-insoluble soft monomer such as methyl acrylate, ethyl acrylate, or butyl acrylate and an anionic monomer selected from methacrylic acid, acrylic acid or maleic acid.

The water-soluble nonionic monomer of the invention is employed, when desired, to enhance the dissolvability of the polymer and to permit a reduction in the amount of anionic functionality present in the polymer. It has been found that when a sheet formed from a polymer of the invention is stored at low relative humidity of about 15% or lower, the polymer sheet tends to become embrittled. Since it may be desirable to formulate rolls containing laundry care products formed from sheets of the invention, it is desirable that the polymer retain sufficient flexibility to be torn from a roll during use. Accordingly, it is desirable that where the sheet is expected to encounter conditions of particularly low relative humidity and/or high temperatures, that the proportion of anionic group containing monomer be minimized. That may be accomplished by substituting a water-soluble nonionic monomer of the invention for a portion of the water-soluble anionic monomer.

Accordingly, monomers for providing enhanced water solubility, but free from ionizable functionalities, include hydroxyalkyl acrylates and methacrylates containing an alkylene group having from 2 to 6 carbon atoms to which the hydroxy group is attached. Examples of such monomers include 2-hydroxypropyl acrylate, 2-hydroxypropyl methacrylate, and, more preferably, 2-hydroxyethyl acrylate and 2-hydroxy ethyl methacrylate. Other water soluble nonionic monomers include N-vinylpyrrolidone, vinyl acetate (hydrolyzed), 3-chloro 2-hydroxypropyl acrylate, 6-hydroxyhexyl acrylate, 5,6-dihydroxyhexyl methacrylate and the like.

Addition polymers of the invention incorporating a nonionic monomer include, for example, ethyl acrylate/hydroxyethyl methacrylate/methacrylic acid; methyl acrylate/hydroxyethyl acrylate/methacrylic acid; butyl acrylate/hydroxypropyl methacrylate/methacrylic acid; ethyl acrylate/N-vinyl pyrrolidone/methacrylic acid; butadiene/hydroxyethyl methacrylate/-methacrylic acid and methyl acrylate/acrylamide/-maleic acid.

Preferred polymers of the invention containing nonionic monomers include: ethyl acrylate/hydroxyethyl methacrylate/methacrylic acid; ethyl acrylate/hydroxyethyl acrylate/methacrylic acid; ethyl acrylate/hydroxyethyl acrylate/acrylic acid; ethyl acrylate/hydroxyethyl methacrylate/acrylic acid and ethyl acrylate/acrylamide/methacrylic acid.

In order to reduce the tendency to develop tack at high relative humidity, it may be desirable to include a minor amount of a water-insoluble hard monomer in the addition polymer of the invention. Water-insoluble hard monomers of the invention include polymerizable ethylenically unsaturated monomers including: benzyl acrylate or methacrylate, vinyl chloride, chlorostyrene, vinyl acetate and alpha-methylstyrene. A preferred class of water-insoluble hard monomers includes: acrylonitrile; methacrylonitrile and styrene.

Enhanced results have been obtained, and accordingly, it is preferred to employ as the hard monomer, a $C_1$ to $C_4$ alkyl methacrylate. Typical examples of such monomers include ethyl methacrylate, propyl methacrylate, isopropyl methacrylate, n-butyl methacrylate and sec-butyl methacrylate. An especially preferred hard monomer is methyl methacrylate.

Examples of preferred polymers of the invention containing such hard monomers include: butyl acrylate/methyl methacrylate/methacrylic acid; ethyl acrylate/methylmethacrylate/methacrylic acid and methyl acrylate/methyl methacrylate/acrylic acid.

In order to impart sufficient water solubility to the polymer, it is important that the anionic groups be at least about 75% neutralized with a Group IA metal cation employed as a base or a basic salt. The metal cation may be sodium, potassium, lithium or the like; the base may be a hydroxide and the basic salt a bicarbonate, a carbonate or the like.

It may be possible to employ other metal cations in the neutralizing compound. Group II metal cations have been found to be somewhat less effective than the Group IA metal cations in providing water and detergent solution solubility for the polymer.

Further, for best dissolution it is preferred that the polymer be at least completely (100%) neutralized based on theoretical before use.

The proportions of monomers employed in the polymer sheet of the invention should be sufficient to provide balanced properties of rapid water solubility and satisfactory mechanical properties, such as flexible tear and dimensional stability at lower and higher relative humidities and low temperature.

In general, at least about 40% by weight of the soft monomer is employed in order to impart sufficient low temperature flexibility to the polymer sheet. It may be possible to employ less than 40% soft monomer. However, excessive amounts of plasticizers are then often required to provide needed flexibility to the sheet. In general, up to about 95% by weight of soft monomer can be employed. Beyond that amount, insufficient ionizable monomer is present to provide the required water solubility. Usually, for best results, from about 77% to 95% by weight of soft monomer is employed.

In general in order to provide the minimum desired water solubility for the polymer in laundry washes containing detergents or the like, at least about 3% by weight of water-soluble anionic monomer is employed. To provide sufficient flexibility at low relative humidity or low temperature generally no more than about 15 weight percent of anionic monomer is employed. As the amount of anionic monomer employed is increased, it has been found that the neutralized polymer becomes increasingly brittle, especially at lower relative humidity or low temperature.

In order to provide improved low humidity flexible tear properties for the sheet, it is preferred to employ from about 5 to 9% and, more preferably, from about 5 to 7% of the water-soluble anionic monomer. For best results, the ionizable groups of the anionic monomer after polymerization should be fully neutralized to enhance solubility and to avoid the potential of adverse reactions with bases or other nitrogen containing compounds in the polymer.

Where the soft monomer employed contains higher alkyl groups, such as butyl groups, usually higher levels, within the above noted range, of anionic monomer is employed to provide satisfactory dissolution of the polymer. Under such circumstances from about 10 to 12% of anionic monomer may be employed. If desired, a portion of the anionic monomer may be substituted with a water-soluble nonionic monomer of the invention.

The water-soluble nonionic monomer of the invention can enhance the water solubility of the addition polymer of the invention without adding thereto ionizable functionalities. In general, use of the water-soluble nonionic monomer is discretionary, particularly where the polymer sheet is not subjected to low relative humidity and/or low temperature.

In general, the particular amount of nonionic monomer employed is not critical. Usually from about 0 to 40% by weight, is employed, with amounts from about 0 to 15% by weight being preferred. It is best to employ significant amounts of nonionic monomer within the broad range, when soft acrylates are utilized having longer alkyl chains, such as butyl groups or 2-ethylhexyl groups. In addition where brittle fracture may be a problem, from about 8 to 10% of nonionic monomer is preferably employed.

The water-insoluble hard monomer of the invention is employed, as desired within generally broad limits. The hard monomer has been found useful to reduce the tack of the resulting polymer at high relative humidity. Substantial amounts of hard monomer are not employed, since they tend to reduce the low temperature flexibility of the polymer in sheet form. Accordingly, from about 0 to 20% by weight of hard monomer is employed.

Preferred addition polymers capable of forming self-supporting films are prepared from the following monomers having the indicated proportions:

| | | | PROPORTION BY WEIGHT PERCENT | | |
|---|---|---|---|---|---|
| SOFT MONOMER | ANIONIC MONOMER | NONIONIC MONOMER | Soft | Anionic | Nonionic |
| $C_1$–$C_4$ alkyl acrylate | Mono unsaturated carboxylic | hydroxy $C_1$–$C_4$ alkyl acrylate<br>hydroxy $C_1$–$C_4$ alkyl methacrylate | 40–95 | 3–15 | 0–40 |
| Methyl acrylate<br>Ethyl acrylate<br>Butyl acrylate | acrylic acid<br>methacrylic acid<br>maleic acid | acrylamide<br>N—vinyl pyrrolidone<br>vinyl acetate<br>hydroxyethyl methacrylate<br>hydroxyethyl acrylate | 77–95 | 5–9 | 0–15 |

Among the factors affecting dissolvability of the film is the molecular weight. In general, as the molecular weight of the polymer increases and other factors such as degree of neutralization, anionic monomer level, etc. are held constant, the dissolution rate is reduced. As its molecular weight is reduced the mechanical properties of the polymer tend to become less desirable. Accordingly, for best results it is preferred that the weight average molecular weight, Mw, is between about 25,000 to 100,000. Within that range, the polymer dissolves or disperses at a reasonable rate even at cool wash temperatures of about 60° F. In addition, the mechanical properties within that range tend to be more uniform at higher and lower temperatures and humidities.

At high relative humidities, usually above about 75% (RH), sometimes encountered during storage or use it has been found that the polymer film of the invention tends to become more tacky. Polymer sheets may tend to stick to one another, especially when stored in a roll or other dispenser type form at high relative humidity. Accordingly, to reduce and/or eliminate that tendency, it may be desirable to employ a barrier coating on the outer surface of the polymer sheet. The barrier coating tends to act to insulate the sheet from the effects of moisture penetration under humid storage conditions.

The barrier coating employed should readily dissolve or break up when the sheet is introduced into water. Suitable barrier coatings generally contain a film-forming hard component, a plasticizing component and an emulsifier. Typical film-forming barrier coatings include paraffin wax and glyceryl monostearate. Typical plasticizing components include lanolin and petrolatum.

Typical emulsifiers include stearic acid and the like. The materials referred to above may perform multiple functions. For example, glyceryl monostearate may function both as an emulsifier and as a film-forming material, while lanolin may function both as an emulsifier and as a softener.

Typical barrier coatings, their method of preparation and their method of application to a surface are disclosed in U.S. Pat. No. 3,322,674 issued May 30, 1967 and U.S. Pat. No. 4,390,436, issued June 28, 1983. The disclosure of said patents is expressly incorporated herein by reference with regard to the constituents, preparation and application of the barrier coating.

It should be understood that the barrier coating need not be applied to the inner surface of the polymer sheet, which contacts the laundry care additives, such as a chlorine bleach. The film-forming polymer of the invention resists the oxidizing effects of reactive laundry care additives and does not require an inner barrier coating to protect either itself or the additive, from deterioration.

In order to assist in providing sufficient low temperature and/or low humidity flexibility to the polymer sheet to prevent the polymer from drying out and becoming embrittled, it may be desirable to employ a plasticizer in the polymer composition. Plasticizers are employed which are resistant to the oxidizing and other reactive effects of the laundry care additives, especially chlorine bleaches. A suitable plasticizer is glyceryl triacetate.

Such a plasticizer may be employed in conventional amounts, usually about 5 to 40 weight percent. Alternatively to reduce embrittlement it may be desirable to employ in the polymer, minor amounts of monomers having relatively low glass transition temperatures. Such monomers as butyl acrylate, 2-ethylhexyl acrylate or hydroxyethyl acrylate may be employed for that purpose.

Optionally, the polymer film could contain filler for improving physical properties, improving dissolution, reducing tackiness, increasing modulus, etc. Examples are talcs, calcium carbonate, polymeric polystyrene or fibers.

It has been found that the optional inclusion of a small amount of a solubilizer or surfactant may sometimes be helpful in aiding dissolution of the sheet during use. Suitable surfactants may be added to the polymer sheet to aid in dissolution during the wash cycle and can include conventional ones stable to bleaching agents and other reactive laundry care additives.

The active laundry care additive employed in the laundry care product of the invention may be selected from the broad range of typical washing machine additives including enzymes, bleaches, fabric softeners, builders, fabric conditioners, water softeners, wrinkle release additives, additives imparting a specific feel or hand to the laundry and detergents. A particularly useful active component is a dry particulate bleaching composition.

Sufficient amounts of such laundry care additives are employed to provide an effective level when released to the wash liquor. In general, it has been found necessary to deliver from about 2 to 20 grams of additive, especially bleaching compound, to a typical wash liquor depending upon for example, the amount of available bleaching species in the bleaching composition. The actual percentage of additive in the final sheet will depend upon many factors including the size and thickness of the sheet. For typical sheets, the ratio of chlorine bleach to polymer should be from about 5:1 to 1:2.

The particulate bleaching composition of the invention is a dry chlorine type bleaching agent. The chlorine bleach may include alkali metal and alkaline earth metal hypochlorites, hypochlorite addition products, chloramines, chlorimines, chloramides and chlorimides. Specific examples of such compounds include calcium hypochlorite, chlorinated trisodium phosphate dodecahydrate, Chloramine T and sodium dichloroisocyanurate. The preferred particulate bleaches employed are the chlorinated isocyanurates.

Other suitable bleaches include the inorganic peroxy bleaches and the organic peroxy bleaches. Typical inorganic peroxy bleaches are the alkali metal salts of perborates, persilicates, percarbonates and perphosphates. Suitable organic peroxy bleaches include urea peroxides or an organic peroxy acid or anhydride. Suitable aromatic peroxy acids and/or salts thereof include monoperoxyphthalic acid and diperoxyterephthalic acid.

The most preferred dry bleaches are the sodium and potassium dichloroisocyanurates or dichloroisocyanurate dihydrates, sodium perborate monohydrate, sodium perborate tetrahydrate, sodium percarbonate and mixtures thereof.

The addition polymer of the invention is prepared by comonomer free radical polymerization and, preferably, by emulsion polymerization. Conventional emulsion polymerization techniques are well known and are described in U.S. Pat. Nos. 2,754,280 and 2,795,564. The comonomrs may be emulsified, if necessary, with an anionic or nonionic dispersing agent, about 0.5% to 10% thereof being used by weight of total monomers. A polymerization initiator of the free radical type, such as ammonium or potassium persulfate, may be used alone or in conjunction with an accelerator, such as potassium metabisulfite or sodium thiosulfate. The initiator and accelerator, commonly referred to as the catalyst system, may be used in proportions from about 0.1 to 2%, each based upon the weight of monomers to be copolymerized. The polymerization temperature maintained during the reaction may be from room temperature to about 90° C. or more.

Examples of dispersing agents, surfactants and emulsifiers suitable for the polymerization process of the invention include alkali metal and ammonium salts of alkyl, aryl, alkaryl, and aralkyl sulfonates, sulfates and polyethersulfates; the corresponding phosphates and phosphonates and ethoxylated fatty acids, esters, alcohols, amines, amides and alkylphenols.

To regulate the molecular weight of the emulsion polymers it is preferred to employ a chain transfer agent, such as a mercaptan, polymercaptan, or polyhalogen compound in the polymerization mix. Esters of mercaptoalkanoic acids are especially preferred as chain transfer agents and, particularly, butylated mercaptopropionic acid (BMPA).

The chain transfer agents are used in amounts typically from about 0.2 to 2% by weight.

Polymer Preparation Example

The addition polymers of the invention may be prepared as follows:

A reactor is partially filled with deionized water and heated under nitrogen feed to a temperature from about 85°-95° C. An aqueous solution of the initiator and, optionally, emulsifiers are thereafter introduced. The reactor is then reheated to the reaction temperature, as needed, and the comonomers feed is introduced. The comonomers feed includes all the comonomers of the invention and the chain transfer agent. The comonomers feed is preferably a delayed feed over a period of from 1 to 2 hours. During that time the desired reactor temperature is maintained.

After all the monomers have been introduced into the reactor the polymerization mixture is held for about 45 minutes at the reaction temperature to ensure completion. Thereafter, the reaction mix is cooled and the latex filtered off. A neutralized polymer formulation is prepared by adding thereto sodium hydroxide solution or the like to neutralize the polymer to at least about 75% of theoretical.

If desired, the addition polymers of the invention can also be prepared by appropriate solution polymerization techniques. Such techniques can include a delayed two hour addition of comonomers containing initiator to a Cellosolve (reaction solvent)—containing reactor at reaction temperatures of about 115° C. After the monomer feed is completed, additional initiator is added to complete polymerization.

Neutralized emulsion polymer films are prepared from high solids neutralized solutions of the polymer by casting or extruding techniques. For example, a polymer film of the invention may be prepared by drawing down a high non-volatiles (25% N.V.) neutralized polymer on a polyethylene film with a Gardner knife or the like and, thereafter, drying the polymer film for 1 hour at 95° C. The dried polymer film is peeled from the polyethylene backing and thereafter employed as a polymer sheet for retaining a laundry care additive of the invention.

If desired, the solid polymer may be recovered from a latex employing a wiped film evaporator or the like. The solid polymer may be treated with base in a Banbury-type mixer, extruded, remaining water removed by venting and the molten ionomer extruded as a sheet. A laundry care additive is dispensed to the sheet, a second sheet is placed on top of the first to form a sandwich or the first sheet folded over the additive and the resulting package heat sealed.

It is important that the laundry care additive form a relatively thin, preferably monoparticulate layer, retained within the polymer sheets. If any pockets of additive remain on the laundry product, then upon handling, the pockets may cause the sheet material to rupture. Accordingly, the product should be formed to prevent formation of additive pockets or cells and to promote formation of a thin, monoparticulate layer of additive anchored within the product.

For that purpose the laundry care additive is uniformly dispensed to a polymer sheet. The polymer sheet may then be folded upon itself or a second sheet may be applied over the dispensed additive. Thereafter under relatively mild conditions of heat and pressure, the layers or sheet material containing dispersed additive are joined to themselves and to the dispersed particulate additive therein to form a unitary monolithic matrix. It is a key advantage of the present invention that the laundry product is a unitary matrix or laminate intimately anchoring and retaining the additive particles, thus preventing formation of pockets or cells of additive.

During sealing, the polymer sheet softens and flows at least in part into the interstices or voids between the additive particles, thus anchoring and retaining them against movement and permanently uniting the polymer sheet and the particles into a single unit.

In a preferred embodiment the sealing conditions and the thickness of the sheet employed is controlled to permit the film to flow substantially into the interstices between the dispersed particles. If desired, in another aspect of this invention the sealing conditions are adjusted to allow the film to completely fill the particle void spaces and to thereby encapsulate the particles. In another embodiment the sealing conditions are selected to allow the film to merely tack or bind the particles within the unit with little film flow into the particle interstices.

If desired, where laundry care additives are employed which are not water sensitive, such as certain fabric softeners and detergents, such additives can be dispersed or mixed into the latex at any stage after polymerization is complete, and the entire mix of polymer and additive may be formed into a unitary sheet by extruding, film casting or the like. In this embodiment the additive may be embedded in the surface of, or even completely within, the sheet matrix.

For best results the product is formed by joining a folded over sheet or two sheets, containing additive therein, at temperatures preferably from about 80°-90° C. The pressure and temperature selected will depend, in part, on the identity of the monomers employed in the polymer film. In general, a laundry product of the invention is usually from about 10 to 80 square inches in area, preferably 40 to 50 square inches, to provide adequate storage space for the additive, although larger and smaller sheets may be employed. The laundry product should be thin enough to dissolve or disperse in warm water in about 20 minutes or less. The product should be thick enough however, to provide proper support.

For these and other purposes, it is preferred that the individual polymer sheets be from about 2-10 mils, preferably 6-8 mils, in thickness. If desired, multiple layers of polymer films can be joined to form a single sheet.

The following examples are provided for illustrative purposes only and should not be deemed to be limitative of scope. In the following examples all parts and percentages are by weight unless otherwise indicated.

EXAMPLE 1

An addition polymer of the invention of the following composition: 84 ethyl acrylate/10 hydroxyethyl methacrylate/6 acrylic acid was prepared as follows:

Into a two liter flask was charged 550 grams of deionized water. The water was heated to 90° C. with stirring under a nitrogen atmosphere. Into the flask was charged 3.75 grams of ammonium persulfate dissolved in 30 grams of deionized water. The contents of the flask were reheated up to 90° C.

A monomer feed was prepared which included 210 grams ethyl acrylate; 25 grams hydroxyethyl methacrylate; 15 grams acrylic acid and 2.50 grams butylated mercaptopropionic acid.

The monomer feed was slowly added to the flask over a period of approximately 1½ hours. The reaction mix was maintained at 90° C. during the reaction. After the addition was complete the emulsion was stirred at 90° C. for 45 minutes.

For stabilization the emulsion was neutralized to 84% of theoretical acrylic acid by addition of 6.97 grams of sodium hydroxide dissolved in 80 grams deionized water. The resulting pH was 7.32.

Thereafter to a 100 gram aliquot of the 84% neutralized polymer having a concentration of 27.30% nonvolatiles was added an additional 0.417 grams of sodium hydroxide as a 5% solution. The pH of the resulting latex was 9.66. The latex was drawn down on a polyethylene film, dried and peeled from the polyethylene backing as a film. The self-supporting film was dried overnight and a film sample heated in an oven maintained at 96° C. for at least 10 minutes and immediately thereafter tested to determine its low humidity flexible tear. The relative humidity in the room in which the sample was tested was 17% at 76° F. The film was strong and provided good flexible tear at low humidity.

A second sample of the cast self-supporting film was tested for its dissolution characteristics. The film was placed in aqueous solution containing 0.01% by weight sodium lauryl sulfate, 0.01% by weight Neodol 25-12 (a $C_{12}$ to $C_{15}$ linear alcohol ethoxylated with 12 moles of ethylene oxide) and 0.02% by weight sodium carbonate. The temperature of the solution was 60° F. Within 20 seconds, the film was visibly dissolving. After 74 seconds the film was totally dissolved.

EXAMPLE 2

An emulsion polymer of the invention was prepared in accordance with the procedure of Example 1 with the exception that the anionic monomer was methacrylic acid and the nonionic monomer was hydroxyethyl acrylate. The composition of the resulting polymer was 84 ethyl acrylate/10 hydroxyethyl acrylate/6 methacrylic acid.

The polymer was processed into a self supporting film in accordance with the procedure of Example 1 and tested for low humidity flexible tear properties as set forth in Example 1. The polymer film was flexible and soft and exhibited good flexible tear properties.

A sample of the polymer film was also tested for its dissolution characteristics in accordance with the procedure of Example 1. Within 10 seconds after the film was added to water at 60° F. it was visibly dissolving and after 126 seconds the film was totally dissolved.

EXAMPLE 3

A polymer of 84 ethyl acrylate/10 hydroxyethyl methacrylate/6 methacrylic acid was prepared as follows:

Into a two liter flask heated to 85° C. with stirring under a nitrogen atmosphere was charged 350.0 grams deionized water; 4.8 grams sodium lauryl sulfate emulsifier and 2.4 grams Triton X-100* emulsifier. Next, 2.4 grams of ammonium persulfate initiator dissolved in 25.3 grams deionized water was added. When the reactor temperature returned to 85° C., a monomers feed was slowly added formed of 210.0 grams ethyl acrylate; 25.0 grams hydroxyethyl methacrylate; 15.0 grams methacrylic acid and 3.0 grams butylated mercaptopropionic acid.

*Triton X-100 is octylphenol ethoxylated with 9-10 moles ethylene oxide.

After a 90 minute delayed comonomers feed the reaction temperature was raised to 90° C. and the emulsion stirred at 90° C. for 45 minutes. Thereafter, the emulsion was cooled to 50° C. and a portion was neutralized to 120% of theoretical methacrylic acid by the addition of 8.38 grams of sodium hydroxide in 217 grams water to provide a pH of 8.98.

The neutralized polymer was formed into a sheet in accordance with the procedure of Example 1 and tested for flexible tear and dissolution. The sheet exhibited good low humidity flexible tear and was not embrittled. A sample of the sheet totally dissolved in the test solution in 160 seconds.

A bleach sheet was prepared from the polymer film by cutting a piece of the film into a rectangle about 4"×5". The sheet was placed on a piece of silicone release paper. A mixture of 3 grams of ACL 56 (sodium dichloroisocyanurate dihydrate, sold by Monsanto), and 1.0 grams borax pentahydrate was uniformly sprinkled over the film; a second sheet of polymer film was placed over the particulate bleach to form a sandwich; a second piece of silicone release paper placed on top of the second sheet; and, using a preheated hot plate, the sandwich was heat sealed on both sides. After cooling, the silicone release paper was removed.

The laundry care product was tested for low humidity flexible tear as in Example 1. Flexibility was observed after a 24 hour period of baking. The product dispersed slowly when added to warm water.

A second bleach sheet was prepared in accordance with the above procedure employing a polymer of 83.5 ethyl acrylate/10 hydroxyethyl methacrylate/6.5 methacrylic acid. The bleach sheet product had good flexible tear at low relative humidity, and exhibited better solubility than the foregoing sample. Fine particles were observed after dissolution in warm water.

EXAMPLE 4

An emulsion polymer of the following composition: 87 ethyl acrylate/7 acrylamide/6 methacrylic acid was prepared in accordance with the procedure of Example 3 from the following ingredients:

| Ingredient | Amount (grams) |
|---|---|
| Ethyl acrylate | 217.5 |
| Acrylamide | 17.5 |
| Methacrylic Acid | 15.0 |
| BMPA | 3.0 |

-continued

| Ingredient | Amount (grams) |
|---|---|
| Sodium Lauryl Sulfate | 4.8 |
| Triton X-100 | 2.4 |
| Ammonium Persulfate | 2.4 |
| Deionized Water | 375.3 |
| Total | 637.9 |

The polymer was neutralized with sodium hydroxide to provide about 110% theoretical neutralization of methacrylic acid. The polymer was cast as a film using a polyethylene backing and a Gardner knife set at 25 mils. The film was dried at room temperature for a few hours and then in a 95° C. oven for 30 minutes.

A sample of the film was added to wash solution at 60° F. as in Example 1. After ten seconds the film was observed dissolving and, after 75 seconds, the film was totally dissolved. A second sample was added to a wash solution at 100° F. and after 60 seconds the film was entirely dissolved.

A sample of the film was tested for flexible tear at low relative humidity. The film exhibited little brittle tear properties when dry. The film was processed into a bleach sheet in accordance with the procedure of Example 3. The bleach contained 1.0 gram sodium sesquicarbonate in place of borax pentahydrate.

The bleach sheet was tested in both 60° F. and 90° F. 0.05% solutions of Tide detergent. The sheet showed very good solubility in the 90° F. Tide solution and somewhat less solubility in the 60° F. Tide solution. In 90° F. tap water the sheet dispersed into many small particles. The sample exhibited moderate brittleness after 2 weeks storage at 20% R.H.

EXAMPLE 5

A 6"×7" bleach sheet was prepared from a polymer of 85 ethyl acrylate/5 methyl methacrylate/10 methyacrylic acid generally in accordance with the procedure of Example 3. The bleach sheet contained 10 grams ACL 56 and 6.78 grams of the polymer neutralized to 75% theoretical with sodium hydroxide. The sheet was stored at ambient conditions of temperature and humidity on a laboratory bench top. The sheet was individually sealed in a Zip-loc type bag. After 102 days the sheet was analyzed and found to retain about 97.5% of its chlorine. The sheet sample dissolved completely upon addition to a 1000 gram aqueous solution.

EXAMPLE 6

A polymer film was prepared and tested in accordance with Example 3 having the composition 90 ethyl acrylate/10 methacrylic acid. A first sample of the film (Sample A) was neutralized with sodium hydroxide to only 50% of theoretical while a second sample, Sample B, was neutralized to 75% theoretical. Sample A exhibited very poor dissolution with large pieces visible in the 60° F. solution and after 3-5 minutes small pieces were visible in the 100° F. solution. The second sample, Sample B, exhibited good dissolution with only dust size particles visible at 60° F. and no particles or very fine ones visible after 1 minute at 100° F.

EXAMPLE 7

In order to determine the effects of molecular weight on the properties of a polymer film of the invention a series of runs were conducted in accordance with the procedure of Example 3 in order to prepare a series of polymers each analyzing at 84 ethyl acrylate/10 hydroxyethyl methacrylate/6 methacrylic acid and exhibiting increasing molecular weights as measured by weight average molecular weight. The following tables present the results of solubility and dry film tear tests conducted on each polymer so produced. In the tables the amount of BMPA chain transfer agent employed in the polymerization process is reported based on weight percent; the pH measured is of the neutralized latex and the solubility is of the Neodol containing detergent solutions at 60° F.

| MOLECULAR WEIGHT | AMOUNT OF BMPA | pH | DRY FILM TEAR* | 60° F. SOLUBILITY |
|---|---|---|---|---|
| 20,490 | 2.00 | 10.00 | 4 | Dissolved in 45 Seconds |
| 25,490 | 1.50 | 10.20 | 3 | Fine particles in 135 seconds |
| 29,170 | 1.00 | 9.76 | 2 | Dissolved in 120 Seconds |
| 46,230 | 0.75 | 8.81 | 1 | Flakes after 600 Seconds |
| 62,390 | 0.50 | 9.05 | 1 | Small and large flakes |
| **Greater than 103,200 | 0.00 | 10.00 | 1 | Film remains largely intact, some medium flakes |

*Dry film tear is measured by slowly stretching (stressing) a dried polymer film and observing the nature of the tear which occurs. The value 1 represents a gradual, generally uniform increase in the size of the tear during stretching. Values greater than 1 denote that a generally uniform increase in the size of the tear initially occurs and after a given period of time, a sudden rupture takes place. Reported films having lower values show greater elongation before rupture. In each film tested, the film possessed sufficient flexibility to be stretched.

**The GPC sample had much insoluble, higher molecular weight polymers. Therefore, actual molecular weight should be higher than 103,200.

The results indicate that films formed from polymers having a molecular weight from about 30,000 to about 100,000 exhibited a relatively low stress tear tendency, while those having a molecular weight from about 20,000 to 30,000 exhibited a higher stress tear tendency. As molecular weight of the polymer increases, the stress tear tendency is reduced. Films formed from polymers having a molecular weight from about 20,000 to 30,000 on the other hand exhibited satisfactory solubility properties. As the molecular weight of the polymer increased, the dissolvability of the film tended to diminish.

However, the following table of the 84 ethyl acrylate/10 hydroxyethyl methacrylate/6 methacrylic acid polymers demonstrate that dissolution of higher molecular weight polymers is enhanced with increased degree of neutralization, at least up to relatively high molecular weight. The degree of neutralization appears to be more critical for higher molecular weight polymers. Nevertheless, the highest molecular weight polymer did not dissolve at 60° F. even at high neutralization.

| Molecular Weight | Amt. of BMPA | pH | Dry Film Tear | 60° F. Solubility |
|---|---|---|---|---|
| 29,170 | 1.0 | 8.96 | 2 | Dissolves in 165 seconds |
| | | 9.76 | 2 | Dissolves in 120 seconds |
| 46,230 | 0.75 | 8.81 | 1 | Flakes after 600 seconds |
| | | 9.84 | 2 | Dissolves in 125 seconds |
| Greater than | 0.00 | 10.00 | 1 | Film remains largely intact, some |

-continued

| Molecular Weight | Amt. of BMPA | pH | Dry Film Tear | 60° F. Solubility |
|---|---|---|---|---|
| 103,200 | | | | medium flakes |

Accordingly, for the films of this invention it is desirable to optimize both the conflicting solubility and dry film tear properties. Therefore, those polymers that exhibit generally acceptable solubility and satisfactory dry film tear properties, are preferred. From the above results it is clear that a polymer having a weight average molecular weight from about 25,000 to 50,000 will best satisfy the requirements for solubility *and* dry film tear. However, it should be recognized that polymer dissolution is greatly improved at higher temperatures, so higher molecular weight polymers can be employed for warmer water applications.

EXAMPLE 8

An emulsion polymer with minimized ionic content was prepared by utilizing low levels of ammonium persulfate initiator. The advantages for such a polymer are: (a) easier determination of the amount of sodium hydroxide required for better control of neutralization, and (b) better tear properties of the dry film.

An emulsion polymer of 84 ethyl acrylate/10 hydroxyethyl methacrylate/6 methacrylic acid was prepared in accordance with the procedure of Example 1 with the exception that the ammonium persulfate level was only 0.3% of the monomer weight instead of 1.5%. A monomer feed of 210 grams ethyl acrylate, 25 grams hydroxyethyl methacrylate, 15 grams methacrylic acid, and 2.50 grams butylated mercaptopropionic acid was added over a 1½ hour period to 450 grams deionized water containing 0.75 gram ammonium persulfate at 85° C. polymerization temperature under nitrogen. After monomer addition was complete, the latex was held at 85° C. for 45 minutes before cooling. The stable latex had no coagulum, a pH of 2.56, and 35.31% solids content. The polymer was neutralized to a theoretical 120% by the addition of 1.18 grams sodium hydroxide in 30 grams water to a 100 gram aliquot of the pH 2.56 latex. The resulting pH was 9.69.

This polymer was compared with one of identical composition and prepared from the identical procedure except that the ammonium persulfate level was 1.5% instead of 0.3%. The pH of the high persulfate polymer solution was 9.53.

Films prepared from these two neutralized polymers and from a high persulfate polymer of the same composition, but having higher molecular weight as fully described in Example 7, had the following properties:

| Polymer Persulfate Level | Weight Av. Molecular Weight Mw | pH | Dry Film Tear | Solubility in 60° F. Tap Water |
|---|---|---|---|---|
| Low (0.3%) | 52,970 | 9.69 | 1 | Fine particles in 175 seconds |
| High (1.5%) | 32,300 | 9.53 | 2 | Fine particles in 200 seconds |
| High (1.5%) | 46,230 | 9.84 | 2 | Dissolves in 125 seconds |

It is apparent from these results that improved balance of properties result from reduction of the persulfate initiator level.

EXAMPLE 9

For comparative purposes a polymer was prepared according to Example 3 of 75 ethyl acrylate/25 hydroxy ethyl methacrylate employing the following ingredients.

| Ingredient | Amount (grams) |
|---|---|
| Ethyl acrylate | 187.5 |
| Hydroxy ethyl methacrylate | 62.5 |
| BMPA | 3.0 |
| Sodium lauryl sulfate | 4.8 |
| Triton X-100 | 2.4 |
| Ammonium persulfate | 2.4 |
| Deionized water | 375.3 |

At the end of the polymerization, the emulsion became taffy-like, was very thick and coagulated upon addition of 500 ml water.

This invention is not to be limited except as set forth in the following claims.

What is claimed is:

1. A water soluble sheet for delivering laundry additive which comprises a self supporting film of an addition polymer formed of:

(a) from about 40 to 95% by weight of a water insoluble soft monomer;

(b) from about 3 to 15% by weight of a water soluble anionic monomer;

(c) from about 0 to 25% by weight of a water soluble nonionic monomer; and (d) from about 0 to 40% by weight of a water insoluble hard monomer;

wherein said addition polymer is at least about 75% neutralized with a Group IA metal base or a Group IA metal basic salt.

2. The sheet of claim 1 in which the addition polymer is a terpolymer of from about 77-95% by weight of said water insoluble soft monomer, from about 5 to 9% by weight of said water soluble anionic monomer and from about 0 to 15% by weight of said water soluble nonionic monomer and is fully neutralized.

3. The sheet of claim 1 in which the water insoluble soft monomer is a $C_1$ to $C_4$ alkyl acrylate.

4. The sheet of claim 1 in which the anionic monomer is selected from methacrylic acid or acrylic acid.

5. The sheet of claim 2 in which the nonionic monomer is selected from hydroxyalkyl acrylates or methacrylates having an alkylene group with from 2-6 carbon atoms to which the hydroxy group is attached.

6. The sheet of claim 2 in which the polymer has a weight average molecular weight from about 25,000 to 100,000.

* * * * *